United States Patent Office 2,914,523
Patented Nov. 24, 1959

2,914,523

METHOD FOR PREPARING FORMAZYL COMPOUNDS FROM ARYLHYDRAZINES AND 1,3,5-TRIAZINES

Christoph J. Grundmann and Alfred Kreutzberger, Columbus, Ohio, assignors to Olin Mathieson Chemical Corporation, a corporation of Virginia No Drawing. Application January 3, 1957
Serial No. 632,259

15 Claims. (Cl. 260—193)

Our invention relates to a novel method for the preparation of formazyl compounds having the general formula:

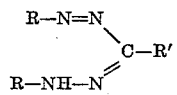

wherein R is aryl and R' is hydrogen, an alkyl group, or an aryl group.

Formazyl compounds have heretofore been prepared by various complicated routes which are not suited to industrial application. Formazyl compounds are useful in the preparation of tetrazolium salts valuable as biological indicators, e.g.

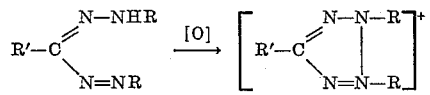

This oxidation is easily carried out with, for example, mercuric oxide, iso-amylnitrite, or lead tetra-acetate.

We have found that formazyl compounds can be prepared in a convenient and simple manner by the reaction of an arylhydrazine and 1,3,5-triazine or a 1,3,5-triazine substituted with alkyl or aryl groups.

According to our invention, an arylhydrazine is reacted with 1,3,5-triazine or an alkyl- or aryl-substituted-1,3,5-triazine, as illustrated by the following equation:

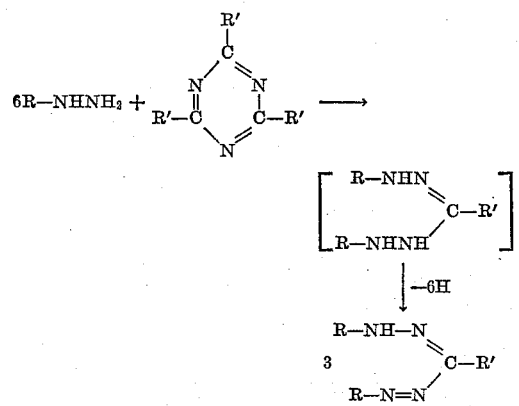

In the formulas R is aryl and R' is selected indifferently from hydrogen, alkyl and aryl groups.

The oxidation of the unstable intermediate, the hydrazyl, is easily effected by, for example, allowing the latter to stand in air, or by using an excess of the arylhydrazine compound. The unstable hydrazyl is formed by admixing the arylhydrazine or a substituted phenylhydrazine with the 1,3,5-triazine or substituted-1,3,5-triazine in a ratio of at least 6 moles of arylhydrazine per mole of triazine. The reaction evolves ammonia as a by-product and generally takes from 1 to 5 hours at room temperature (20° C.). At higher temperatures, up to 100° C., a shorter reaction time is realized. Temperatures over 100° C. are generally not desirable, however, because the evolution of ammonia is vigorous enough to cause frothing of the reaction mixture. Temperatures as high as about 200° C. can be used, however, depending on the particular reactants. The product can be isolated by drying or washing with a solvent such as ether. Further purification can be accomplished by crystallization of these formazyl compounds from any suitable solvent, for example, methanol.

The arylhydrazines useful in the method of our invention include such arylhydrazines as phenyl and naphthyl hydrazines and such arylhydrazines substituted with such groups as halogen, e.g. chlorine, bromine, fluoride and iodine, nitro groups, and lower alkyl groups, e.g. methyl, ethyl, propyl and butyl. Examples of suitable arylhydrazines include phenylhydrazine, p-halophenylhydrazines, p-nitrophenylhydrazine, 2,4-dinitrophenylhydrazine, tolylhydrazine, alpha- and beta-naphthylhydrazines, and alpha- and beta-naphthylhydrazines substituted with halogen, nitro or lower alkyl groups.

The 1,3,5-triazines useful in the method of our invention include 1,3,5-triazine and 1,3,5-triazine substituted with alkyl or aryl groups as described above. Examples of suitably substituted triazines for use in our novel reaction include 2,4,6-tris-[4-chlorophenyl]-1,3,5-triazine, 2,4,6 - tribenzyl - 1,3,5 - triazine, 2,4,6-trimethyl-1,3,5-triazine, 2,4,6-triethyl-1,3,5-triazine, 2,4,6-tris-p-tolyl-1,3,5-triazine, 2,4,6-tris-[2-hydroxyphenyl]-1,3,5-triazine, 2,4,6-triphenyl-1,3,5-triazine, 2,4,6-trinaphthyl-1,3,5-triazine, 2,4,6-tris-[4-hydroxy-naphthyl-1]-1,3,5-triazine and 2-methyl-4,6-diphenyl-1,3,5-triazine.

The use of 1,3,5-triazine with any of the above arylhydrazines results in the formation of the corresponding substituted formazyl hydride. If the 1,3,5-triazine is substituted in the 2, 4 and 6 positions, these substituents will be attached to the formazyl group in place of the hydrogen. Thus, reaction of phenylhydrazine and 2,4,6-triphenyl-1,3,5-triazine gives triphenyl-formazane, or formazyl benzene. Any substitutents on the aryl group of the arylhydrazines will, of course, remain throughout the reaction and appear in the same position on the aryl group of the formazyl compound. The use of triazines with unlike groups in the 2, 4 and 6 position results in the formation of mixed formazyl compounds.

The following examples further illustrate our invention:

EXAMPLE I

*Formazyl hydride*

1.5 grams of 1,3,5-triazine were added to 12 grams of phenylhydrazine, at room temperature. The mixture warmed and began evolving ammonia. After about one hour, the evolution of ammonia subsided and a viscous orange oil remained. This oil was poured in thin layers on shallow dishes and was left in contact with air, at room temperature, for two weeks. During this time, the color turned to a deep red and the mass crystallized to 10.4 grams or 83.6 percent of the theory of red needles which were vacuum-filtered and dried on a porous plate. The crude formazyl hydride, or formazane, was recrystallized from 41 percent aqueous methanol and then from anhydrous methanol. The purified product remained as red needles, melting at 119°–120° C.

|  | C | H | N |
|---|---|---|---|
| Calculated for $C_{13}H_{12}N_4$ | 69.63 | 5.39 | 24.98 |
| Found | 69.60 | 5.83 | 24.69 |

EXAMPLE II

*p,p'-Dibromoformazyl hydride*

A mixture comprising 9.3 grams of freshly prepared p-bromophenylhydrazine and 1.3 grams of 1,3,5-triazine was placed in a flask on an oil bath at 100° C. for one hour. During this time ammonia was evolved from the fused mass which gradually changed color from orange to deep red and crystallized. After cooling the product, it was freed from adhering oil by vacuum filtration. The yield was 9.6 grams, or 81 percent of the theory of p,p'-dibromoformazyl hydride, or p-bromophenylazo-p-bromophenylhydrazonomethane. After recrystallization from glacial acetic acid, the fine reddish brown needles melted at 114°–115° C. A mixed melting point with an authentic specimen prepared according to Busch and Wolbring, Journ. prakt. Chem. [2], 71, 372 (1905), was without depression.

EXAMPLE III

*p,p'-Dinitroformazyl hydride*

A mixture of 4 grams of 1,3,5-triazine and 22.9 grams of p-nitrophenylhydrazine melted to a reddish mass upon being placed in a flask and immersed in an oil bath at 140° C. The evolution of ammonia was so vigorous at this temperature that the flask was removed from the oil bath. When the frothing had ceased, the temperature within the flask was maintained at 100° C. for ½ hour. Upon cooling to room temperature, the product solidified to a bluish-violet micro-crystalline mass which was washed with ether. The yield was 16.4 grams or 67 percent of the theory of p,p'-dinitroformazylhydride, or p-nitrophenylazo-p-nitrophenylhydrazonomethane. The purified reddish-brown crystals sintered at 94°–95° C. and melted at 104°–105° C. A mixed melting point with an authentic specimen prepared according to Busch and Wolbring, Journ. prakt. Chem. [2], 71, 372 (1905), was without depression.

EXAMPLE IV

*Formazyl methane*

A clear solution was formed when a mixture of 1.0 gram of 2,4,6-trimethyl-1,3,5-triazine and 5.3 grams of phenylhydrazine was immersed in an oil bath at 100° C. Upon taking up the temperature, evolution of ammonia started at 150° C. The originally colorless solution became orange at 170° C. and deep red toward 190° C. This temperature was maintained for ½ hour, when the evolution of ammonia subsided. After cooling, the deep red, viscous oil was poured in thin layers on Petri dishes and was left in contact with air, at room temperature, for one week. During this time, the mass crystallized largely to red needles which were vacuum-filtered and dried on a porous plate. The yield was 2.3 grams or 38 percent of the theory of formazyl methane or phenylazophenylhydrazono-ethane. Recrystallized from ethanol, the red glittering needles obtained melted at 122°–123° C. This melting point was not depressed upon admixing with an authentic specimen (Bamberger, Pemsel, Ber., 36, 87 [1903]).

EXAMPLE V

*Formazyl benzene*

Upon heating a mixture of 5.0 grams of 2,4,6-triphenyl-1,3,5-triazine and 10.5 grams of phenylhydrazine in an oil bath, evolution of ammonia and orange discoloration started at 160° C. With increasing temperature, the color of the suspension became more intensively red. At 190° C., a deep red viscous solution was formed which was maintained at this temperature for two hours and then allowed to cool. Thereby a deep red solid crystallized which was vacuum-filtered and then proved to be a mixture of substances. Separation into its components was best accomplished by boiling ethanol. The insoluble part weighed 4.0 grams and was identified as unreacted 2,4,6-triphenyl-1,3,5-triazine. Evaporation of the ethanolic extract to dryness resulted in 1.4 grams of red leaflets whose melting point of 174°–175° C. was not lowered when mixed with an authentic sample of formazyl benzene or phenylazo-phenylhydrazono-phenylmethane (v. Pechmann, Ber., 27, 1690 [1894]). The amount of 1.4 grams of formazyl benzene corresponds to a 20 percent conversion of 2,4,6-triphenyl-1,3,,5-triazine. Yield: 100 percent.

We claim:

1. The method of preparing formazyl compounds which comprises admixing an aryl hydrazine of the formula

R—NHNH₂ wherein R is a radical selected from the group consisting of the benzene and naphthalene series, with a triazine of the formula

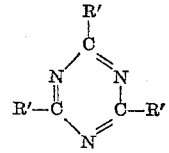

wherein R' is selected indifferently from the group consisting of hydrogen, lower alkyl and radicals of the benzene and naphthalene series, in a ratio of at least 6 moles of the hydrazine per mole of the triazine, at a temperature from about room temperature to about 200° C. to form an unstable oxidizable intermediate of the formazyl compound, and oxidizing the intermediate by means of an oxidizing agent selected from the group consisting of air and an aryl hydrazine of the above formula to form the formazyl compound.

2. The method of preparing formazyl compounds which comprises admixing a hydrazine of the formula

R—NHNH₂ wherein R is a radical selected from the group consisting of the benzene and naphthalene series, with a triazine of the formula

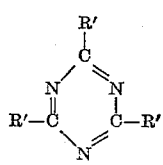

wherein R' is selected indifferently from the group consisting of hydrogen, lower alkyl and radicals of the benzene and naphthalene series, in a ratio of at least 6 moles of the hydrazine per mole of the triazine, at a temperature from about room temperature to about 200° C. to form an unstable oxidizable intermediate of the formazyl compound, and oxidizing the intermediate by means of air to form the formazyl compound.

3. The method of claim 2 in which the temperature of reaction varies from about room temperature to about 100° C.

4. The method of preparing formazyl hydride which comprises admixing at least 6 moles of phenylhydrazine with each mole of 1,3,5-triazine at a temperature from about room temperature to about 200° C. to form an unstable oxidizable intermediate of formazyl hydride and oxidizing the intermediate by means of air to form formazyl hydride.

5. The method of preparing p,p'-dibromoformazyl hydride which comprises admixing at least 6 moles of p-bromo-phenylhydrazine with each mole of 1,3,5-triazine at a temperature from about room temperature to about 200° C. to form an unstable oxidizable intermediate of p,p'-dibromoformazyl hydride and oxidizing the intermediate by means of air to form p,p'-dibromoformazyl hydride.

6. The method of preparing p,p'-dinitroformazyl hydride which comprises admixing at least 6 moles of p-nitro-phenylhydrazine with each mole of 1,3,5-triazine at a temperature from about room temperature to about 200° C. to form an unstable oxidizable intermediate of p,p'-dinitroformazyl hydride and oxidizing the intermediate by means of air to form p,p'-dinitroformazyl hydride.

7. The method of preparing formazyl methane which comprises admixing at least 6 moles of phenylhydrazine with each mole of 2,4,6-trimethyl-1,3,5-triazine at a temperature from about room temperature to about 200° C. to form an unstable oxidizable intermediate of formazyl methane and oxidizing the intermediate by means of air to form formazyl methane.

8. The method of preparing formazyl benzene which comprises admixing at least 6 moles of phenylhydrazine with each mole of 2,4,6-triphenyl-1,3,5-triazine at a temperature from about room temperature to about 200° C. to form an unstable oxidizable intermediate of formazyl benzene and oxidizing the intermediate by means of air to form formazyl benzene.

9. The method of preparing formazyl compounds which comprises admixing a hydrazine of the formula

R—HNHN$_2$ wherein R is a radical selected from the group consisting of the benzene and naphthalene series, with a triazine of the formula

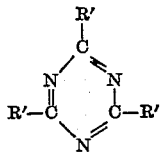

wherein R' is selected indifferently from the group consisting of hydrogen, lower alkyl and radicals of the benzene and naphthalene series, in a ratio of at least 6 moles of the hydrazine per mole of the triazine, at a temperature from about room temperature to about 200° C. to form an unstable oxidizable intermediate of the formazyl compound, and oxidizing the intermediate by the use of an excess of the hydrazine to form the formazyl compound.

10. The method of claim 9 in which the temperature of reaction varies from about room temperature to about 100° C.

11. The method of preparing formazyl hydride which comprises admixing at least 6 moles of phenylhydrazine with each mole of 1,3,5-triazine at a temperature from about room temperature to about 200° C. to form an unstable oxidizable intermediate of formazyl hydride and oxidizing the intermediate by the use of an excess of the phenylhydrazine to form formazyl hydride.

12. The method of preparing p,p'-dibromo-formazyl hydride which comprises admixing at least 6 moles of p-bromo-phenylhydrazine with each mole of 1,3,5-triazine at a temperature from about room temperature to about 200° C. to form an unstable oxidizable intermediate of p,p'-dibromoformazyl hydride and oxidizing the intermediate by the use of an excess of the p-bromo-phenylhydrazine to form p,p'-dibromoformazyl hydride.

13. The method of preparing p,p'-dinitroformazyl hydride which comprises admixing at least 6 moles of p-nitro-phenylhydrazine with each mole of 1,3,5-triazine at a temperature from about room temperature to about 200° C. to form an unstable oxidizable intermediate of p,p'-dinitroformazyl hydride and oxidizing the intermediate by the use of an excess of the p-nitrophenylhydrazine to form p,p'-dinitroformazyl hydride.

14. The method of preparing formazyl methane which comprises admixing at least 6 moles of phenylhydrazine with each mole of 2,4,6-trimethyl-1,3,5-triazine at a temperature from about room temperature to about 200° C. to form an unstable oxidizable intermediate of formazyl methane and oxidizing the intermediate by the use of an excess of the phenylhydrazine to form formazyl methane.

15. The method of preparing formazyl benzene which comprises admixing at least 6 moles of phenylhydrazine with each mole of 2,4,6-triphenyl-1,3,5-triazine at a temperature from about room temperature to about 200° C. to form an unstable oxidizable intermediate of formazyl benzene and oxidizing the intermediate by the use of an excess of the phenylhydrazine to form formazyl benzene.

References Cited in the file of this patent

Chemical Reviews, vol. 55, Number 2, page 399, April 1955.